(12) United States Patent
Calvert

(10) Patent No.: US 9,033,276 B1
(45) Date of Patent: May 19, 2015

(54) TELESCOPING LANDING LEG SYSTEM

(71) Applicant: TLL Associates, Trustee for Telescoping landing leg system CRT Trust, Manassas, VA (US)

(72) Inventor: S. Mill Calvert, Manassas, VA (US)

(73) Assignee: TLL Associates, Manassas, VA (US), Trustee for Telescoping landing leg system CRT Trust ( * ) Notice: Subject to any disclaimer, the term of this patent is extended or adjusted under 35 U.S.C. 154(b) by 0 days.

(21) Appl. No.: 14/591,683

(22) Filed: Jan. 7, 2015

(51) Int. Cl.
*B64C 25/32* (2006.01)
*B64C 25/10* (2006.01)

(52) U.S. Cl.
CPC ........... *B64C 25/32* (2013.01); *B64C 2025/325* (2013.01); *B64C 25/10* (2013.01)

(58) Field of Classification Search
CPC .. B64C 2025/008; B64C 25/10; B64C 25/32; B64C 2025/325; B64G 1/16; B64G 1/62; B64G 2001/1071
See application file for complete search history.

(56) References Cited

U.S. PATENT DOCUMENTS

| | | | | | |
|---|---|---|---|---|---|
| 2,630,989 | A | * | 3/1953 | Sikorsky | 244/102 R |
| 2,909,342 | A | * | 10/1959 | Maltby | 244/103 R |
| 2,927,747 | A | * | 3/1960 | Bennie | 244/17.17 |
| 2,933,270 | A | * | 4/1960 | Maltby | 244/103 R |
| 2,933,271 | A | * | 4/1960 | Maltby | 244/103 R |
| 2,935,277 | A | | 5/1960 | Lucien | |
| 2,939,655 | A | | 6/1960 | Hartel | |
| 3,042,345 | A | * | 7/1962 | Holland, Jr. | 244/104 R |
| 3,121,547 | A | | 2/1964 | Paxhia et al. | |
| 3,173,632 | A | * | 3/1965 | Woods | 244/100 R |
| 3,175,789 | A | * | 3/1965 | Blumrich | 244/100 R |
| 3,181,821 | A | * | 5/1965 | Webb | 244/100 R |
| 3,191,316 | A | * | 6/1965 | Dryden | 434/34 |
| 3,243,149 | A | * | 3/1966 | Burns | 244/100 R |
| 3,295,798 | A | * | 1/1967 | Webb | 244/100 R |
| 3,387,805 | A | * | 6/1968 | Barnett et al. | 244/138 R |
| 3,393,883 | A | | 7/1968 | Smith et al. | |
| 3,857,533 | A | * | 12/1974 | Mason | 244/17.17 |
| 3,951,361 | A | | 4/1976 | Hrusch | |
| 4,047,681 | A | | 9/1977 | Hartel | |
| 4,062,507 | A | * | 12/1977 | Felder | 244/17.17 |
| 4,234,143 | A | | 11/1980 | Pesando | |
| 4,907,760 | A | | 3/1990 | Sealey et al. | |
| 6,227,494 | B1 | * | 5/2001 | Turner | 244/172.6 |
| 6,805,320 | B2 | | 10/2004 | Derrien et al. | |
| 6,922,610 | B2 | * | 7/2005 | Okamoto et al. | 700/245 |
| 7,327,112 | B1 | * | 2/2008 | Hlynka et al. | 318/568.12 |
| 7,871,044 | B2 | * | 1/2011 | Hursig et al. | 244/183 |
| 8,490,919 | B2 | | 7/2013 | Nannoni et al. | |
| 8,714,480 | B2 | * | 5/2014 | Prud'Homme-Lacroix et al. | 244/102 R |
| 8,740,140 | B2 | | 6/2014 | Alleau et al. | |
| 8,960,600 | B2 | * | 2/2015 | Carreker | 244/100 R |
| 2007/0221783 | A1 | * | 9/2007 | Parks et al. | 244/102 A |
| 2012/0080560 | A1 | * | 4/2012 | Piccone et al. | 244/108 |
| 2012/0298796 | A1 | * | 11/2012 | Carreker | 244/100 R |
| 2014/0249702 | A1 | * | 9/2014 | Pflug et al. | 701/16 |

* cited by examiner

*Primary Examiner* — Brian M O'Hara
*Assistant Examiner* — Michael Kreiner
(74) *Attorney, Agent, or Firm* — Louis Ventre, Jr.

(57) ABSTRACT

A telescoping landing leg system includes an aerial vehicle capable of vertical takeoff and landing; and a plurality of legs. Each leg has at least two nested sections. A first section is fixed to the aerial vehicle and a second section slidably retained within the first section. The second section extends out of the first section by telescoping therefrom to engage the ground when the aerial vehicle is landing. A central processing unit may be used to control extension of any leg independently of any other leg in the plurality of legs. Sensors may be used to provide data to the central processing unit.

4 Claims, 3 Drawing Sheets

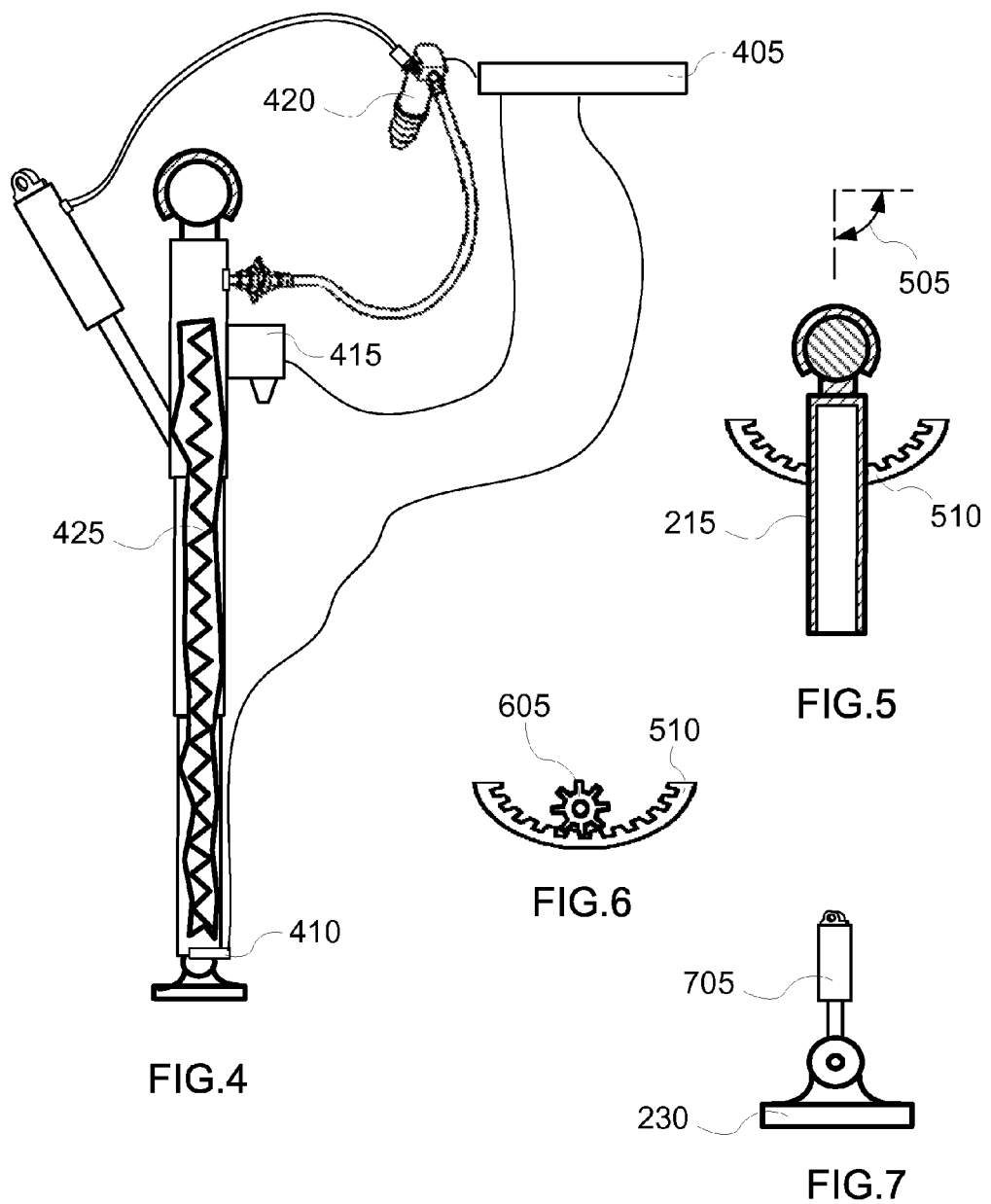

TELESCOPING LANDING LEG SYSTEM

TECHNICAL FIELD

In the field of aeronautic, landing gear in the form of telescoping members that enable vertical takeoff and landing aerial vehicles to land on non-flat surfaces.

BACKGROUND ART

Helicopters and other vertical take-off and landing aircraft essentially require a horizontal and flat landing space. Inclined or irregular surfaces are unsuited for landing such craft because of the dangers associated with other than horizontal rotation of the craft's rotors. Thus, for safety of the aircraft and any persons on the ground, the landing gear of all such aircraft form a horizontal plane for landing on a flat landing pad or relatively flat ground.

For many thousands of years, mankind has dreamed of being able to fly as he has watched the beauty and technological wonder of birds in flight. Since the days of Kitty Hawk and the Wright brothers, the airplane has given man the ability to take flight. An airplane, however, cannot match the ability of birds to take flight from almost any location and to land in almost any location. The airplane requires the long hard surface of a runway to get enough speed to create lift or to safely return to earth. The invention of the helicopter has so far been the closest to the technological ability of a bird to take off and land in any desired location.

SUMMARY OF INVENTION

A telescoping landing leg system includes an aerial vehicle capable of vertical takeoff and landing; and a plurality of legs. Each leg has at least two nested sections. A first section is fixed to the aerial vehicle and a second section slidably retained within the first section. The second section extends out of the first section by telescoping therefrom to engage the ground when the aerial vehicle is landing. A central processing unit may be used to control extension of any leg independently of any other leg in the plurality of legs. A sensor may be added to each leg so that it is connected to the central processing unit. This sensor measures the load being exerted on a leg after it is in contact with the ground. A rangefinder may be added to each leg and connected to the central processing unit to measure a distance between the leg and the ground. The leg may be connected to the aerial vehicle though a ball joint so that the angle of the leg approaching the ground can be varied to suit the terrain. The leg angle may be adjusted by an annular gear attached to the first section of each leg and a pinion gear attached to the aerial vehicle so that rotation of the pinion gear causes the leg to change its downward angle.

Technical Problem

The technological flaw in vertical takeoff and landing aerial vehicles, such as helicopters, is that such vehicles need a flat horizontal surface to land on or take flight from. A helicopter is used in this discussion to simplify the presentation. The invention is not limited to helicopters but applies to any vertical takeoff and landing aerial vehicle. If the helicopter tries to land on an unlevel surface, the spinning blades can impact the ground or cause the helicopter to flip on its side and crash.

It is well known that a bird can land on virtually any surface or take flight from there at anytime. It would revolutionize man's ability to fly if there were a technology that could enable a helicopter to land or take off from an uneven surface or terrain. Many times for both military and search and rescue uses, there are hilly, jagged, uneven, mountainous, and rocky landscapes where it would be helpful to be able to land a helicopter. There currently is no practical way to land a helicopter in many of these needed locations.

Solution to Problem

The technological solution is a telescoping landing leg system for landing on such uneven surfaces. It works by having separate telescoping landing legs mounted to the aerial vehicle. Each telescoping landing leg extends out the needed distance to provide proper footing and support on the ground to land in any uneven terrain while keeping the helicopter level and safe. Preferably, the telescoping landing leg system is a fully automated computerized landing system, which also has a manual pilot override control.

When a helicopter hovers above a potential uneven landing site, the computer controller pictures and analyzes the landing site using sensors. The computer controller measures the specific distance that each separate landing leg needs to telescope down to make appropriate contact with the ground.

Preferably, each landing leg system has a load cell and a laser rangefinder connected to the computer controller to enable the computer controller to manipulate each leg into proper angle and extended position for a safe landing on the uneven terrain. The computer controller sends instructions to cause each of the legs to telescope to the required distance to make firm contact with the ground while keeping the helicopter and spinning blades safely level.

The telescoping legs are manipulated using well known hydraulics, pneumatics, electrical motors and/or electromagnetic devices using a computer controller. Preferably, the computer controller automatically controls functions of the helicopter while the helicopter lands on uneven terrain. The computer controller preferably manipulates lift, blade spin, landing position, and levelness so that the pilot can sit back and relax while the telescoping landing leg system telescopes the legs to the best position to land the helicopter very safely.

When the helicopter takes flight again, the computer controller preferably retracts the telescoping sections to a fully retracted position.

Advantageous Effects of Invention

If the helicopter is just landing on a normal helipad or a flat surface, the telescoping landing leg system may be turned off and not used at all. With a telescoping landing leg system, the helicopter is given greater versatility to land on uneven terrain.

The telescoping landing leg system provides a mission-expanding capability to a helicopter. It enables a helicopter to land in previously unsuitable terrains and landscapes. It provides a capability to safely land a helicopter while holding the helicopter in a level attitude so the rotors stay level and inhibit dangers from tipping over, from rotor impact with the ground, or from rotor impact with nearby objects. The telescoping landing leg system opens up a whole new realm of possibilities for both military missions and search and rescue uses. The telescoping landing leg system enlarges the scope of missions to save lives and aid military or law enforcement agencies.

The telescoping landing leg system may be made in a lower-priced pilot-controlled manual version, whereby the helicopter pilot pushes buttons to extend out each telescoping landing leg.

The telescoping landing leg system makes a quantum technological leap to move us closer to that beautiful and wonderful ability that a bird has.

The telescoping landing leg system will save lives and provide uplifting benefit to all of mankind throughout the world.

BRIEF DESCRIPTION OF DRAWINGS

The drawings illustrate preferred embodiments of the telescoping landing leg system according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 4 is an elevation view of three nested sections in a telescoping leg showing an internal spring.

FIG. 5 is an elevation view of a first section of a leg having an annular gear affixed to the rear side of the leg.

FIG. 6 is an elevation view of the annular gear and a meshing pinion gear.

FIG. 7 is an elevation view of a foot for the leg showing an attached shock absorber.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
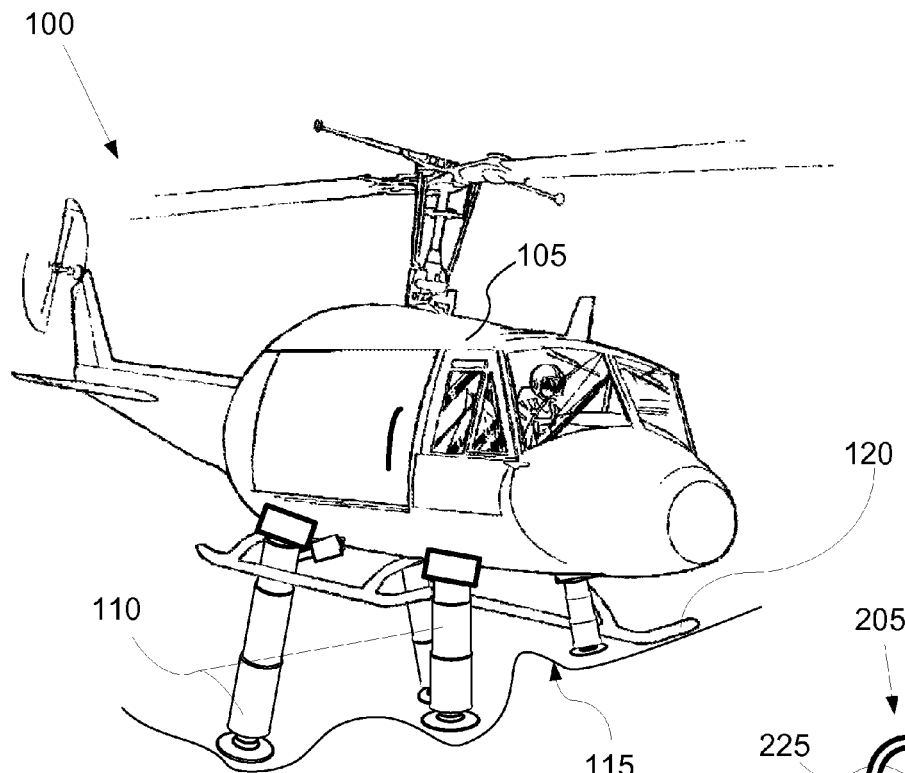
FIG. 1 is a perspective of an embodiment of the telescoping landing leg system.
Figure 2:
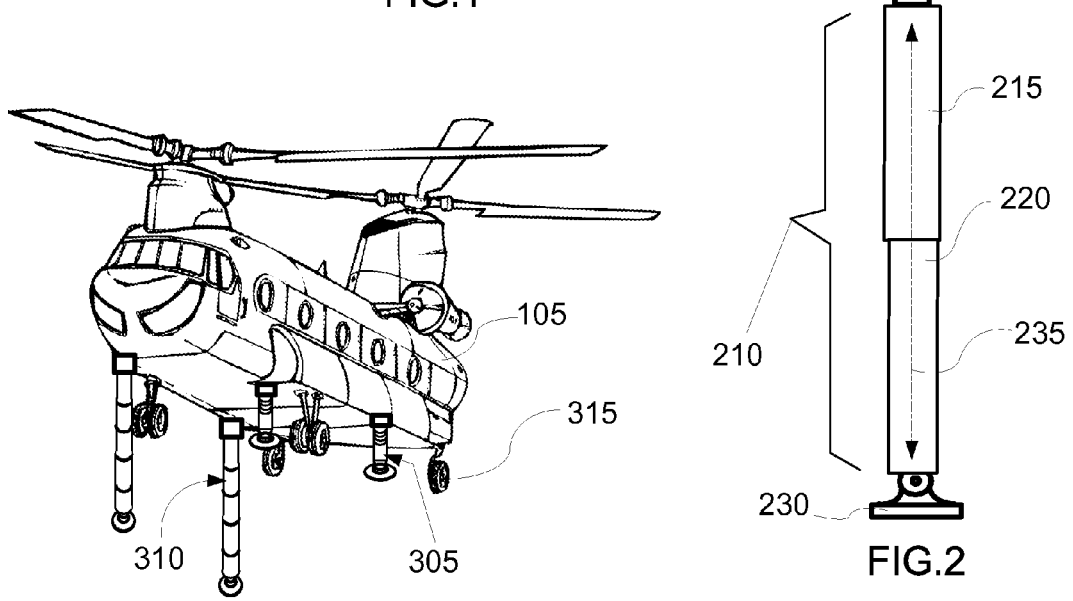
FIG. 2 is an elevation view of two nested sections in a telescoping leg.

The telescoping landing leg system (100) includes an aerial vehicle (105), a plurality of legs (110) having nested sections (210) that telescope in and out during operation of the telescoping landing leg system (100), a central processing unit (405), and a rangefinder (415) for each leg. FIGS. 1 and 4 show these components. FIG. 1 is a perspective of an embodiment of the telescoping landing leg system (100).

The aerial vehicle (105) is any aircraft capable of vertical takeoff and landing and includes but is not limited to a helicopter, an unmanned aerial vehicle, other rotorcraft such as a quad copter, a tiltrotor craft, such as the BELL BOEING V-22 OSPREY, and an aircraft using directed jet thrust such as the HARRIER family. For simplicity, the examples discussed herein and shown in the figures are helicopters. However, the principles of the telescoping landing leg system (100) apply for any aerial vehicle (105), as so defined.

Figure 3:
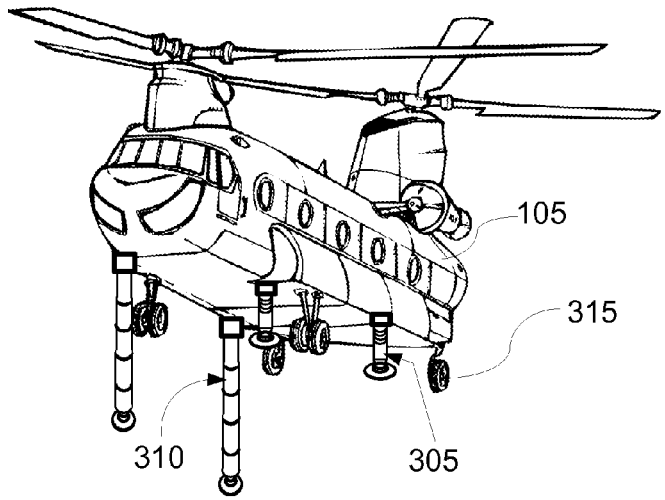
FIG. 3 is a perspective of a second embodiment of the telescoping landing leg system.
Figure 8:
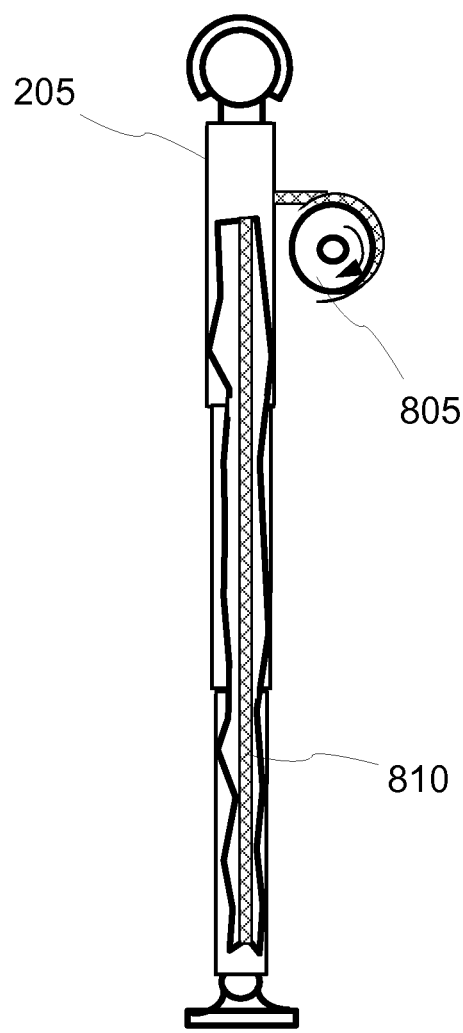
FIG. 8 is an elevation view of three nested sections in a telescoping leg showing an internal wire rope and external motorized rewind spool.

In FIG. 1, the aerial vehicle (105) is a helicopter having a standard landing skid (120) on each side of the aerial vehicle (105). FIG. 3 shows an aerial vehicle (105) being a helicopter having a wheel (315) at various locations on the aerial vehicle (105).

The plurality of legs (110) is simply more than one leg (205). Preferred embodiments have three or more legs. The more legs, the more stability in landing on uneven surfaces. However, more than four legs in the plurality of legs (110) may add unnecessary weight for the added stability benefits gained. Thus, the most preferred embodiments have four legs as shown in FIG. 1 and FIG. 3.

Each leg (205) in the plurality of legs (110) includes nested sections (210). For the simplest embodiment, the nested sections (210) include a first section (215) fixed to the aerial vehicle (105) and a second section (220) slidably retained in respect to the first section (215). The second section (220) is configured to extend axially (235) from the first section (215) by telescoping therefrom to engage the ground (115) when the aerial vehicle (105) is landing. Preferably, the second section (220) extends from within the first section (215) so that gravity will not aid water in infiltrating the joint. Alternatively, the first section (215) may extend from within the second section (220).

Thus, these nested sections (210) are telescoping sections such that all but the first section (215) slide out to create an extended leg (310) for landing. All but the first section (215) also slide in so that the leg (205) may be a retracted leg (305) when an extended leg (310) is not needed for landing. While the first section (215) is attached to the aerial vehicle (105), the attachment may enable swivel or rotation of the leg (205) with respect to the attachment point so as to change the downward angle (505) of the telescoping sections to better engage an uneven terrain. Such rotation may be enabled, as two examples, by a pinned joint or a ball joint (225). Unlike a pinned joint which enables rotation on a single plane about the axis of the pin, a ball joint (225) enables rotation about a horizontal circle and so offers greater manipulation potential. Thus, in preferred embodiments the telescoping landing leg system (100) includes a ball joint (225) attached between the first section (215) and the aerial vehicle (105).

The central processing unit (405) is configured to control extension of any leg (205) independently of any other leg (205) in the plurality of legs (110). This control may be automated or may be by manual action of a pilot, or may be a combination of automation and manual operation. Preferably, the central processing unit (405) will be programmed to automatically controls landing-relevant functions of the aerial vehicle (105) while the aerial vehicle (105) lands on uneven terrain. Non-transitory computer memory connected to the central processing unit (405) stores the program instructions. Preferably, the central processing unit (405) controls one or more of lift, rotor spin, landing position, levelness, and telescoping of each leg to implement a safe landing of the aerial vehicle (105) on uneven terrain. A variety of sensors, either already existing on the aerial vehicle (105) or newly added, may be employed to provide data to the central processing unit (405) to implement these controls. Preferably, the central processing unit (405) controls each leg (205) to telescope out a designated amount and at the best angle to engage the ground (115) while keeping the aerial vehicle (105) in a safe landing attitude. The central processing unit (405) preferably stops telescoping the nested sections (210) when a leg (205) has made ground contact.

The rangefinder (415) is also present on each leg (205) in the plurality of legs (110). If four legs define the plurality of legs (110), then there are preferably four rangefinders, one connected to each leg (205). Each rangefinder (415) is configured to measure a distance between the leg (205) it is connected to and the ground (115). Each rangefinder (415) is also electrically connected to the central processing unit (405) so as to provide distance measurements or readings to an operating program for the central processing unit (405) controlling the operation of the plurality of legs (110).

Examples of an acceptable rangefinder include an ultrasonic ranging module, laser rangefinder, and radar distance measurement. Preferably, the rangefinder (415) is a laser rangefinder, which uses a laser beam to determine distance, in this case, the distance to the ground. The most common form of laser rangefinder operates on the time of flight principle by sending a laser pulse in a narrow beam towards the object and measuring the time taken by the pulse to be reflected off the target and returned to the sender. The laser rangefinder comes in relatively small modules and since it operates using the speed of light, it is fast and reliable.

The telescoping landing leg system (100) may include a sensor (410) on each leg (205) in the plurality of legs (110). Each sensor (410) measures the load being exerted on the leg (205) on which it is present. Such measurement occurs after said leg (205) is in contact with the ground (115). If four legs define the plurality of legs (110), then there are preferably four sensors, one connected to each leg (205). Each sensor (410) is also electrically connected to the central processing unit (405) so as to provide load measurements or readings to an operating program for the central processing unit (405) controlling the operation of the plurality of legs (110).

There are many types of load sensors available. A more common load sensor is a transducer that converts an input mechanical force into an electrical output signal. Such load sensors are also commonly known as load transducers or load cells. Another example is a strain gage sensor that produces an electrical signal proportional to the load acting on it.

Changing the downward angle (505) of the leg (205) may also be accomplished by a gear arrangement. Preferably for an embodiment using a gear arrangement, an annular gear (510) is attached to the leg (205) and this is acted upon by a pinion gear (605) attached to the aerial vehicle (105) so that when the pinion gear (605) rotates, it moves the annular gear (510) and since the annular gear (510) is fixed to the leg (205), the pinion gear (605) also moves the leg (205) in a plane. The pinion gear (605) is typically a round gear as shown in FIG. 6. In an embodiment with a gear arrangement, the pinion gear (605) is also the drive gear.

Thus, an embodiment of the telescoping landing leg system (100) may include an annular gear (510) attached to the first section (215) of each leg (205) in the plurality of legs (110) and a pinion gear (605) attached to the aerial vehicle (105) wherein rotation of the pinion gear (605) causes the first section (215) to change the downward angle (505) of said leg (205).

Each leg (205) in the plurality of legs (110) may include a foot (230) that contacts the ground (115) to increase the area of the weight or forces acting on the ground (115). The foot (230) may be connected to a shock absorber (705) or other spring-like device to cushion the landing process for any occupants of the aerial vehicle (105).

The telescoping legs are preferably powered by hydraulics. FIG. 4 shows a hydraulic power system (420). When already present on an aerial vehicle (105), it may be of benefit to be able to tap into that for the operability of the telescoping landing leg system (100).

Hydraulic systems are very common on aerial vehicles, at least for example for the application of wheel brakes. Multiple hydraulic systems are often used on aircraft to ensure reliability and safety. For example, for primary and secondary flight controls, the landing gear, nose-wheel steering, thrust reversers and cargo doors.

When it is not practical to use an existing hydraulic system to power the operation of the plurality of legs (110), a self contained system of fluid pressurization and power generation is preferably included. Power is thus transmitted by the hydraulic fluid through system specific hydraulic lines and used to telescope the plurality of legs (110).

In alternative embodiments, the plurality of legs (110) is powered by a pneumatic system or an electrical motor.

Preferably, each leg (205) is also telescoped back into a retracted leg (305) by the same power source use to produce an extended leg (310). Supplemental return force may be supplied using a spring (425). Alternatively, a wire rope (810) and a motorized rewind spool (805) may be used to provide a backup means for ensuring that the plurality of legs (110) can be retracted for landing when not needed.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the aircraft industry.

What is claimed is:

1. A telescoping landing leg system comprising:
an aerial vehicle capable of vertical takeoff and landing;
a plurality of legs, each leg in the plurality of legs comprising nested sections, the nested sections comprising a first section fixed to the aerial vehicle and a second section slidably engaged with the first section, the second section configured to extend axially from the first section by telescoping therefrom to engage the ground when the aerial vehicle is landing;
a central processing unit configured to control extension of any leg independently of any other leg in the plurality of legs and further configured to change the downward angle of each leg in the plurality of legs prior to touchdown so as to engage an uneven terrain; and
a rangefinder operable using emitted energy selected from the group consisting of laser light and sound for each leg in the plurality of legs, each rangefinder connected to the central processing unit, each rangefinder configured to measure a distance between said leg and the ground while the aerial vehicle hovers above the ground.

2. The telescoping landing leg system of claim 1, further comprising a sensor for each leg in the plurality of legs, each sensor connected to the central processing unit, each sensor measuring a load being exerted on said leg after said leg is in contact with the ground.

3. The telescoping landing leg system of claim 1, further comprising a ball joint attached between the first section and the aerial vehicle.

4. The telescoping landing leg system of claim 1, further comprising an annular gear attached to the first section of each leg in the plurality of legs and a pinion gear attached to the aerial vehicle wherein rotation of the pinion gear causes the first section to change a downward angle of said leg.

* * * * *